United States Patent
Nakai

[11] Patent Number: 5,867,151
[45] Date of Patent: Feb. 2, 1999

[54] COORDINATE INPUT DEVICE AND INPUT DISPLAY APPARATUS INCLUDING THE INPUT DEVICE

[75] Inventor: Yutaka Nakai, Yokohama, Japan

[73] Assignee: Kabushiki Kaisha Toshiba, Kawasaki, Japan

[21] Appl. No.: 824,090

[22] Filed: Mar. 25, 1997

[30] Foreign Application Priority Data

Mar. 25, 1996 [JP] Japan .................................. 8-067965

[51] Int. Cl.$^6$ ................................................... G09G 5/00
[52] U.S. Cl. ........................ 345/173; 345/178; 178/18.01
[58] Field of Search .................... 345/173, 174, 345/175, 176, 178; 178/18.01, 18.03

[56] References Cited

U.S. PATENT DOCUMENTS

| | | | |
|---|---|---|---|
| 4,775,765 | 10/1988 | Kimura et al. | 345/173 |
| 4,931,782 | 6/1990 | Jackson | 178/18 |
| 5,357,062 | 10/1994 | Rockwell et al. | 178/18 |
| 5,451,724 | 9/1995 | Nakazawa et al. | 345/173 |
| 5,521,336 | 5/1996 | Buchanan et al. | 178/18 |
| 5,541,370 | 7/1996 | Matsuda et al. | 345/173 |
| 5,625,382 | 4/1997 | Ebihara et al. | 345/173 |

FOREIGN PATENT DOCUMENTS 6-160835  6/1994  Japan .

*Primary Examiner*—Amare Mengistu
*Assistant Examiner*—Ricardo Osorio
*Attorney, Agent, or Firm*—Oblon, Spivak, McClelland, Maier & Neustadt, P.C.

[57] ABSTRACT

On a transparent substrate of a coordinate input device are formed a plurality of first wirings formed on a light transmitting substrate to extend in parallel in a first direction, and a plurality of second wirings extending in a second direction perpendicular to the first direction. Each of the second wirings is removed at the intersection with the first wiring to form intermittent divided sections. A flexible electrode is also formed on the substrate to bring two adjacent divided sections of the second wiring into an electrical contact with each other, and faces the first wiring located between the divided section, with a free space defined therebetween. When an external pressure is applied toward the first wiring, the flexible electrode, which is connected to the second wiring, is deformed so as to be brought into an electrical contact with the corresponding first electrode. The light transmitting substrate is arranged to face a counter substrate of a liquid crystal display device.

13 Claims, 5 Drawing Sheets

COORDINATE INPUT DEVICE AND INPUT DISPLAY APPARATUS INCLUDING THE INPUT DEVICE

BACKGROUND OF THE INVENTION

The present invention relates to a coordinate input device capable of detecting the coordinates of a point to which pressure is applied by a writing pen or a finger, and to an input display apparatus including the particular coordinate input device.

Known coordinate input devices of this kind include, for example, a pressure sensitive type device in which the coordinates are detected on the basis of pressure applied by a writing pen or a finger, and an electrostatic coupling type or electromagnetic coupling type device in which an electrostatic coupling or electromagnetic induction between a writing pen and an electrode is utilized. These coordinate input devices are used in combination with display devices such as a liquid crystal display device to form input display apparatuses capable of input and display of information.

Known input display apparatuses include a type that a transparent coordinate input device is arranged on the front surface of a display device, and another type that a transparent coordinate input device is arranged on the back surface of a display device. The coordinate input device used in the input display apparatus of the former type includes the pressure sensitive type device, electrostatic coupling type device and electromagnetic coupling type device. On the other hand, the electromagnetic coupling type coordinate input device is used in the input display apparatus of the latter device.

In manufacturing the input display apparatus having an integral structure of a coordinate input device and a display device, it is necessary to employ the step of bonding the coordinate input device to the display device. In the bonding step, it is difficult to align accurately the coordinate input device with the display device, with the result that a positional deviation tends to take place between the display device and the coordinate input device. For eliminating the positional deviation, it is necessary to correct the electrical circuit for each input display device product, leading to an increased manufacturing cost of the input display apparatus.

It should also be noted that, in bonding the coordinate input device directly to the display device, an interference band is generated by uneven gaps between the two devices, leading to a marked deterioration in the display performance of the input display apparatus. To overcome this difficulty, it is necessary to provide a gap of about 1 mm between the two devices. As a result, the display surface of the display device is made apart from the input surface of the coordinate input device by a distance equal to sum of the thickness of the coordinate input device and the gap provided between the coordinate input device and the display device, giving rise to generation of parallax between the display position and the coordinate input position depending on the viewing direction of the user. In addition, the presence of the gap between the two devices makes it difficult to decrease the thickness of the module consisting of the coordinate input device and the display device.

Further, in the input display apparatus of the former type, the reduction of transmittance caused by the coordinate input device remains to be a serious problem to be solved. Particularly, in an apparatus using a reflection type liquid crystal display device, the ambient light passes through the coordinate input device twice, leading to a further reduction of the transmittance. For example, a pressure sensitive type coordinate input device comprises in general two flexible substrates each having a transparent electrode formed thereon. These two flexible substrates are arranged to face each other with spacers disposed therebetween so as to provide a predetermined free space between the two. In an input display apparatus having the particular coordinate input device of the pressure sensitive type arranged on the front surface of a liquid crystal display device, both a counter electrode of the liquid crystal display device and two transparent electrodes of the coordinate input device are arranged in the optical path. In addition, a gap is defined between the coordinate input device and the liquid crystal display device. It follows that the light transmittance is markedly lowered, making it difficult to achieve display of images of a high brightness.

As described above, in an integral structure having a coordinate input device and a display device, a positional deviation takes place in the bonding step of these devices, leading to reduction in the input accuracy. Also, a positional deviation between these devices in the thickness direction brings about parallax between the display position and the coordinate input position depending on the viewing angle. Further, the coordinate input device, which is of a laminate structure comprising a plurality of films, is low in its light transmittance. It follows that the quality of the image displayed by the input display apparatus utilizing the coordinate input device is lowered, particularly where a reflection type liquid crystal display device is used in combination with the coordinate input device.

BRIEF SUMMARY OF THE INVENTION

The present invention has been contrived in consideration of the above circumstances and its object is to provide a coordinate input device which exhibits a high light transmittance, and can be made sufficiently thin, and to provide an input display apparatus which permits obtaining a high quality image, permits diminishing a positional deviation when bonded to a display device, and also permits diminishing a positional deviation dependent on the viewing direction between the display position and the coordinate input position.

According to the present invention, there is provided a coordinate input device, comprising:

a plurality of first wirings formed on a substrate to extend in parallel in a first direction;

a plurality of second wirings formed on the substrate to extend in parallel in a second direction perpendicular to the first direction, the intersections of the second wirings with the first wirings being removed to form intermittent divided sections; and a plurality of flexible electrodes each of which is bridged between two adjacent divided sections of each second wiring to electrically connect the divided sections each other and faces the first wiring located between the two adjacent divided section, with a free space defined therebetween, the flexible electrode being deformable upon receipt of an external pressure applied from outside toward the first wiring so as to be brought into an electrical contact with the first wiring.

In the coordinate input device of the present invention, the substrate is made of a light transmitting material, and at least one of the first wiring, second wiring and flexible electrode is made of a light transmitting material.

According to the present invention, there is provided an input display apparatus comprising a display device, and a coordinate input device arranged to face a display plane of the display device. The coordinate input device includes:

a plurality of first wirings formed on a substrate to extend in parallel in a first direction;

a plurality of second wirings formed on the substrate to extend in parallel in a second direction perpendicular to the first direction, the intersections of the second wirings with the first wirings being removed to form intermittent divided sections; and a plurality of flexible electrodes each of which is bridged between two adjacent divided sections of each second wiring to electrically connect the divided sections each other and faces the first wiring located between the two adjacent divided section, with a free space defined therebetween, the flexible electrode being deformable upon receipt of an external pressure applied from outside toward the first wiring so as to be brought into an electrical contact with the first wiring.

The input display apparatus includes a plurality of pixels forming a picture image. Also, the first and second wirings and flexible electrode included in the coordinate input device are arranged to face the peripheral portion of the pixel of the display device.

In any of the coordinate input device and input display device of the present invention constructed as pointed out above, any of the flexible electrodes is deformed upon receipt of an external pressure, with the result that the deformed flexible electrode achieves an electrical connection between the first and second wirings. In the present invention, voltage is applied to any of the first and second wirings so as to detect the current flowing through the first or second wiring, thereby to detect the coordinates of the flexible electrode which has been deformed upon receipt of the external pressure.

In the input display apparatus of the construction pointed out above, the image displayed on the display plane of the display device is visually recognized. Since the first wirings, second wirings and flexible electrodes of the coordinate input device are formed on a single substrate in the present invention, making it possible to decrease the thickness and improve the light transmittance of the coordinate input device. As a result, a high quality image can be obtained. Further, the coordinate input device can be aligned accurately with the display device, making it possible to make the deviation depending on the viewing angle negligibly small between the display position and the coordinate input position. It follows that the input display apparatus can be used satisfactorily.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1 to 6 show a coordinate input device according to an embodiment of the present invention, in which:

FIG. 1 is an enlarged plan view showing a part of the coordinate input device,

FIG. 2 is a cross sectional view taken along line II—II shown in FIG. 1,

FIG. 3 is a cross sectional view taken along line III—III shown in FIG. 1,

FIG. 4 is a plan view showing a manufacturing step of a flexible electrode included in the coordinate input device shown in FIG. 1, FIG. 5 is a cross sectional view taken along line V—V shown in FIG. 4, and FIG. 6 is an equivalent circuit diagram of the coordinate input device;

DETAILED DESCRIPTION OF THE INVENTION

Let us describe some embodiments of the present invention with reference to the accompanying drawings.

Figure 1:
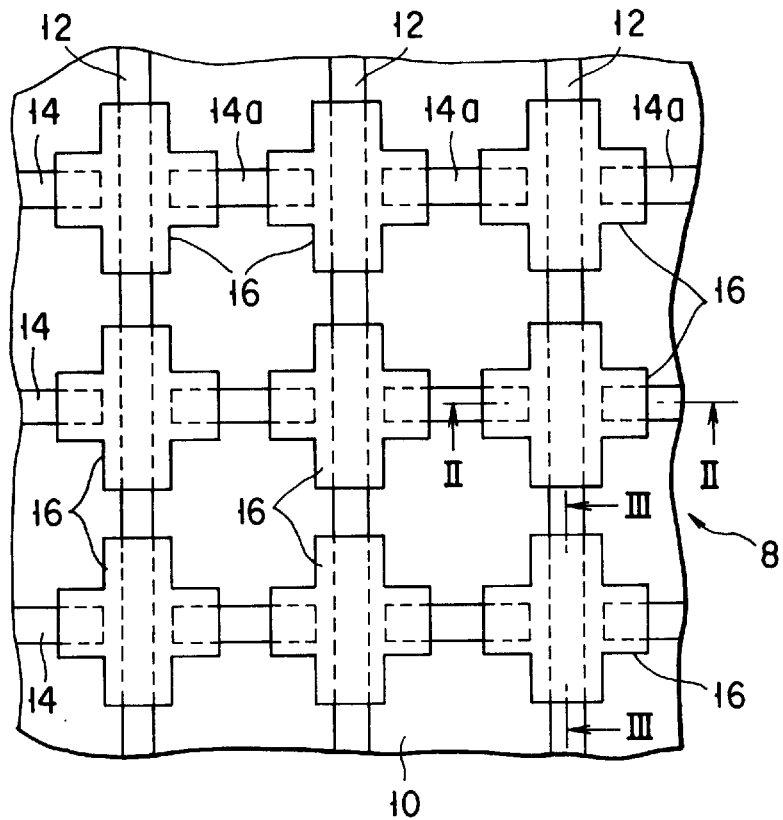
Figure 2:
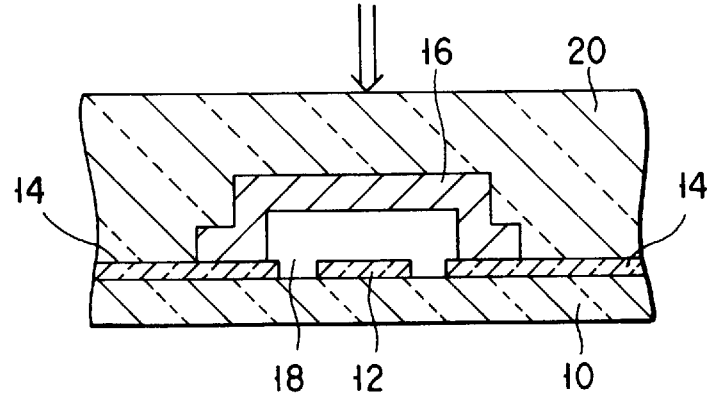
Figure 3:
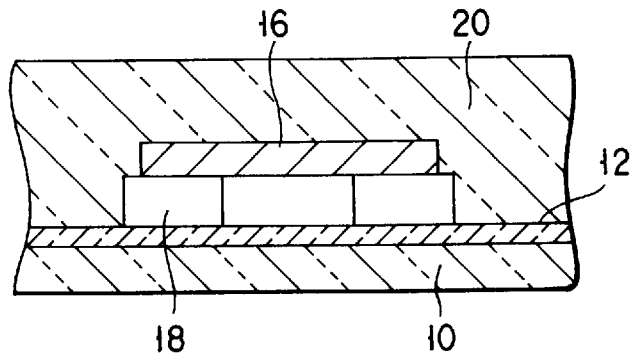

As shown in FIGS. 1 to 3, a coordinate input device 8 according to a first embodiment of the present invention comprises a substrate 10 made of a light transmitting material, e.g., glass. A plurality of elongated first electrodes 12 acting as first wirings and a plurality of elongated second electrodes 14 acting as second wirings are formed on the substrate 10.

The first electrodes 12, which are positioned a predetermined distance apart from each other, extend in parallel in the same direction. Likewise, the second electrodes 14, which are positioned a predetermined distance apart from each other, extend in parallel in a direction perpendicular to the extending direction of the first electrodes 12. Each of the second electrodes 14 is removed in the intersection with the first electrodes 12 to allow the second electrode 14 to extend intermittently. In other words, each of the second electrodes 14 is divided into a plurality of divided sections 14a. These first and second electrodes 12 and 14 are formed of a light transmitting material such as indium tin oxide (ITO).

A flexible electrode 16 acting as a switching element is formed over the portion wherein the first and second electrodes 12, 14 are close to each other, i.e., over the removed portion between the two adjacent divided sections 14a of each second electrode 14. Specifically, each flexible electrode 16 is bridged, over the first electrode 12, between two adjacent divided sections 14a which face each other with interposing the first electrode 12 therebetween. Two ends of each flexible electrode 16 are electrically connected with end portions of the divided sections 14a of the second electrode 14. As seen from FIG. 3, the flexible electrode 16 is positioned to face the first electrode 12 with a free space 18 defined therebetween.

Accordingly, the plurality of divided sections 14a of the second electrode 14 are electrically connected with one another by means of the flexible electrodes 16, thereby constituting as a whole a single continuous second electrode.

Further, a protective layer 20 made of polyethylene terephthalate (PET) is formed on the substrate 10 to cover the first and second electrodes 12, 14 and the flexible electrodes 16.

Figure 4:
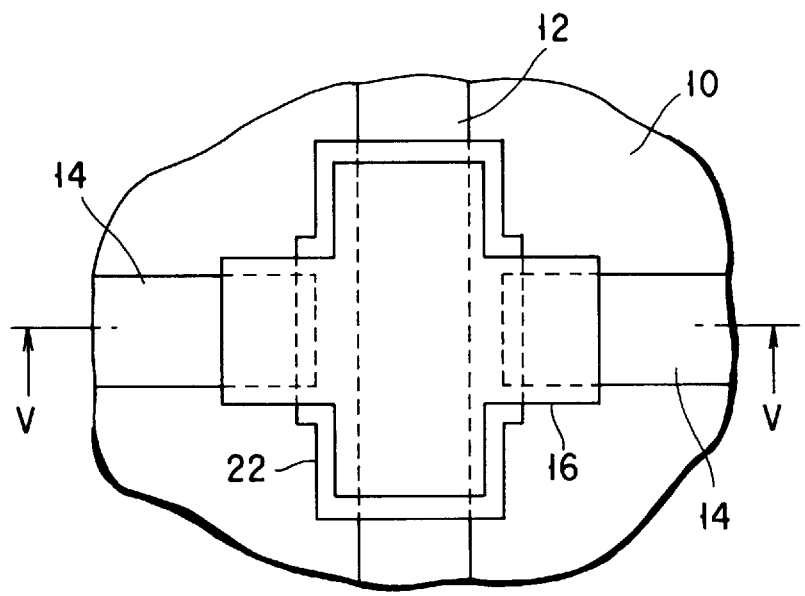
Figure 5:
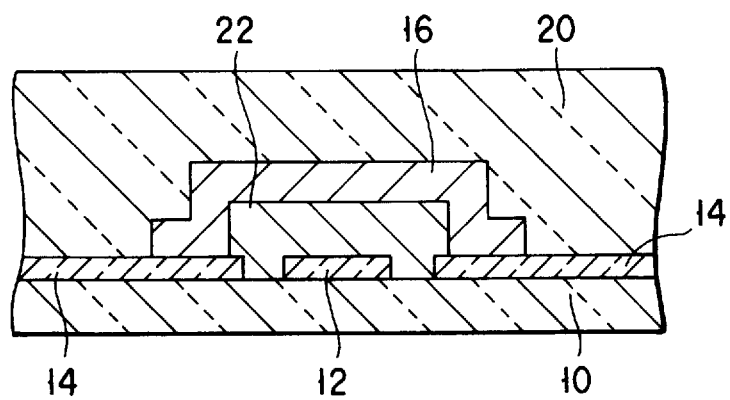

The lamination module constructed as described above can be manufactured by the process shown in FIGS. 4 and 5. In the first step, an ITO film is formed in a thickness of 100 nm on the substrate 10, followed by patterning the ITO film by a photolithography step and an etching step so as to form the first and second electrodes 12 and 14. Then, an Al film is formed in a thickness of 100 nm on the substrate 10 to cover the first and second electrodes 12, 14, followed by patterning the Al film by a photolithography step and an etching step so as to form substantially rectangular sacrificial layers 22 covering the intersection between the first electrodes 12 and the removed portions of the second electrodes 14. As apparent from the drawings, each of the sacrificial layers 22 positioned in the intersection is in contact with the first electrode 12 and with the end portions of two adjacent divided sections 14a of the second electrode 14.

In the next step, a Ti film is formed in a thickness of 1,000 nm on the substrate 10, followed by patterning the Ti film by a photolithography step and a dry etching step using a mixture of a $CF_4$ gas and an $O_2$ gas so as to form the flexible electrodes 16 so that each flexible electrode covers the sacrificial layer 22 and the end portions of the divided section 14a of the second electrode 14. The flexible electrode 16 is substantially cross-shaped (+). Thereafter, the sacrificial layers 22 are removed by etching so as to provide the free space 18 between each flexible electrode 16 and the corresponding first electrode 12. Finally, PET film is formed in a thickness of 5,000 nm to form the protective layer 20, thereby to obtain the desired lamination module.

In the lamination module of the construction described above, each flexible electrode 16 is normally positioned to face the first electrode 12 with the free space 18 defined therebetween, with the result that the first electrodes 12 are not electrically connected to the second electrodes 14. However, if pressure is applied to the protective layer 20 as denoted by an arrow in FIG. 2, the flexible electrode 16 is deformed so as to contact the first electrode 12, with the result that the first and second electrodes 12 and 14 are electrically connected to each other via the flexible electrode 16. In other words, the flexible electrode 16 acts as a switching element.

In the present embodiment, a plurality of the flexible electrodes 16 are arranged on a single plane, as shown in FIG. 1. If any one of the flexible electrodes 16 is depressed from outside by a writing pen or a finger, the depressed electrode 16 permits the corresponding first and second electrodes 12, 14 to be electrically connected to each other. It follows that the coordinates of the depressed portion can be detected.

Figure 6:
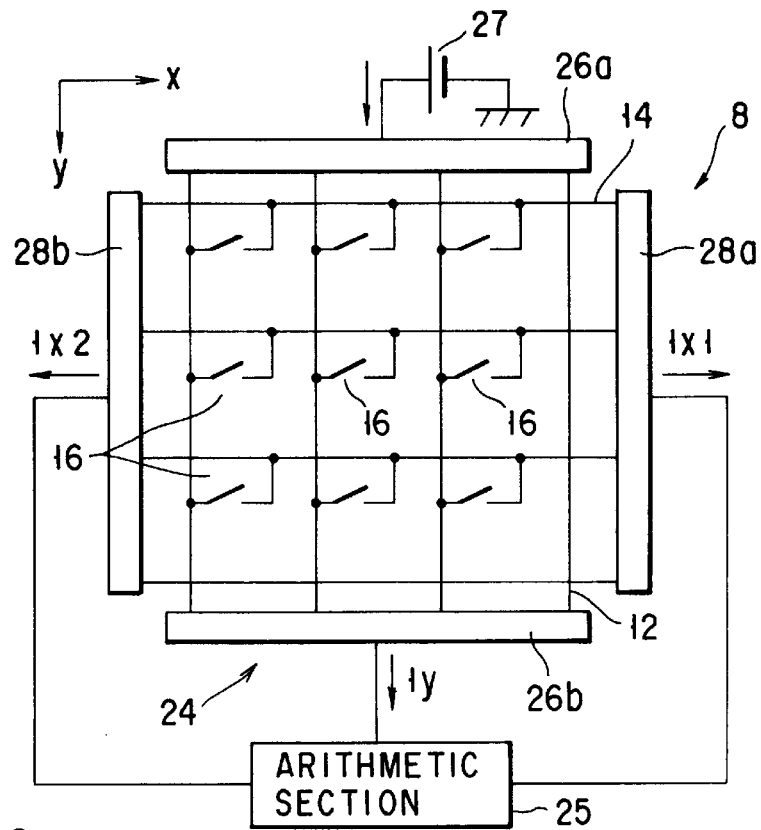

FIG. 6 shows an equivalent circuit diagram of the coordinate input device 8. As seen from the drawing, the coordinate input device 8 comprises a coordinate detecting section 24 for detecting the coordinates of the depressed point. The coordinate detecting section 24 includes a low resistance electrode 26a connected to one ends of the first electrodes 12, and another low resistance electrode 26b connected to the other ends of the first electrodes 12. A power source 27 as a power supplying means is connected to the low resistance electrode 26a. The coordinate detecting section 24 also comprises a low resistance electrode 28a connected to one ends of the second electrodes 14, and another low resistance electrode 28b connected to the other ends of the second electrodes 14. The low resistance electrodes 26a, 28a and 28b are connected to an arithmetic section 25 acting as calculating means.

Where the coordinate input device 8 is not depressed, the flexible electrodes 16 are off and not in contact with the first electrodes 12. In this case, the electric current supplied from the power source 27 to the low resistance electrode 26a flows as current Iy only into the low resistance electrode 26b via the first electrodes 12. However, currents I×1 and I×2 do not flow into the low resistance electrodes 28a, 28b.

Where the coordinate input device 8 is depressed so as to deform any of the flexible electrodes 16 and bring the deformed flexible electrode 16 into contact with the corresponding first electrode 12, the current flows through the deformed flexible electrode 16 into the second electrode 12. As a result, the current Iy flowing into the low resistance electrode 26b is decreased, compared with the case where all the flexible electrodes 16 are off. The decrease of the current Iy is a function of the sum of currents I×1, I×2 and the wire resistance of the first electrode 12, making it possible to calculate the y-axis position of the depressed point by comparison with the current Iy. On the other hand, a ratio of I×1 to I×2 is caused by the wire resistance of the second electrode 14, making it possible to calculate the x-axis position of the depressed point based on the ratio noted above. It follows that it is possible to detect the depressed point, i.e., input point, by detecting the y-axis position and y-axis position of the depressed point.

In the detecting method described above, the input point can be easily detected by utilizing the wire resistances of the first and second electrodes 12, 14. However, the detecting accuracy tends to be lowered, if the first and second electrodes 12, 14 are not uniform in thickness and width. To overcome this difficulty, the coordinate detecting section 24 may be constructed as shown in FIG. 7.

Figure 7:
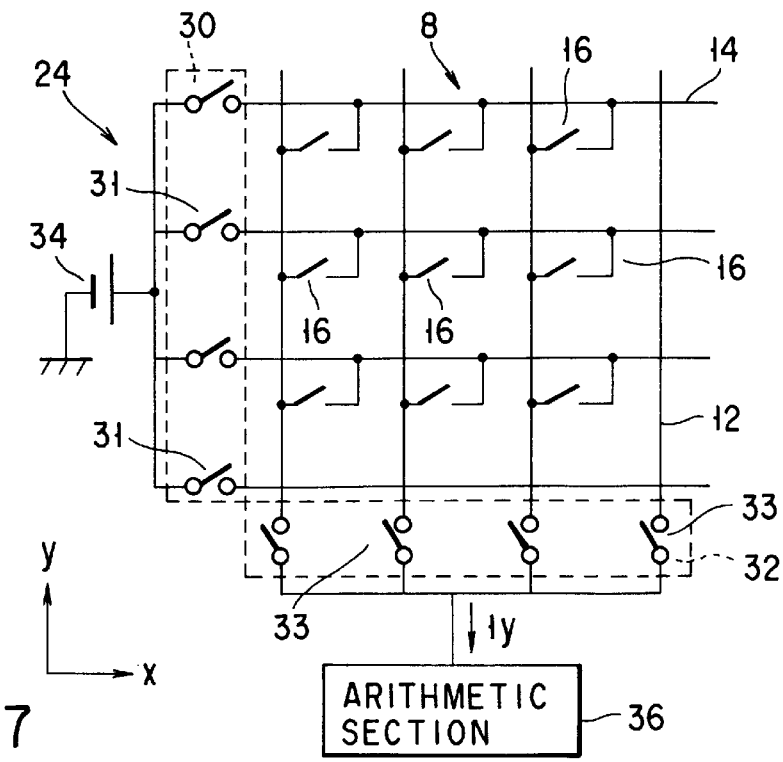
FIG. 7 is an equivalent circuit diagram of a coordinate input device equipped with a coordinate detecting section according to a modification of the present invention.

Specifically, the coordinate detecting section 24 shown in FIG. 7 comprises a scanning circuit 30 including a plurality of switches 31 connected to one ends of the respective second electrodes 14, and another scanning circuit 32 connected to one ends of the respective first electrodes 12. A power source 34 serving as power supply means is connected to the scanning circuit 30. Further, the scanning circuit 32 is connected to an arithmetic section 36 acting as calculating means.

The scanning circuit 30 permits applying voltage to the second electrodes 14 simultaneously or successively. It is possible to apply a pulsating voltage to the second electrodes 14 in order to decrease the power consumption of the coordinate detecting circuit 24 under a waiting state. On the other hand, all the switches 33 included in the other scanning circuit 32 are kept closed under the ordinary state.

Where the coordinate input device 8 including the coordinate detecting section 24 of the construction described above is not depressed, all the flexible electrodes 16 are kept off. In this case, the current Iy does not flow into the scanning circuit 32. However, if any one of the flexible electrodes 16 is deformed so as to be brought into electrical contact with the corresponding first electrode 12 upon application of an external pressure to the coordinate input device 8, current flows into the first electrode 12 through the deformed flexible electrode 16. It follows that the pressure application can be detected by the arithmetic section 36 as the currently. Upon detection of the current Iy, the switches 31 included in the scanning circuit 30 are closed successively so as to permit voltage to be applied successively to the second electrodes 14 starting with the second electrode 14 arranged at one end and ending in the second electrode 14 arranged at the other end. In this step, detected is the current Iy flowing into the scanning circuit 32. It should be noted that the y-axis position of the depressed point of the coordinate input device 8 can be obtained by detecting the scanning timing of the scanning circuit 30, i.e., by detecting the switch 31 which is closed when the current Iy is detected.

In the next step, the switches 33 included in the scanning circuit 32 are successively turned on and off starting with the switch 33 arranged at one end and ending in the switch 33 arranged at the other end, and the scanning timing at the detection of the current Iy is detected by the arithmetic circuit 36. In other words, the switch 33, which is closed when the current Iy is detected, is detected by the arithmetic circuit 36 so as to detect the x-axis position of the depressed point of the coordinate input device 8.

As described above, the coordinate detecting section 24 of the particular construction makes it possible to eliminate the adverse affects given by the nonuniform thickness or width of the first and second electrodes 12, 14 and to obtain a sufficiently high detection accuracy regardless of noises given from the outside. It follows that it is possible to deal satisfactorily with the problems which may take place when the coordinate input device is enlarged.

With the coordinate input device 8 constructed as described above, the first and second electrodes 12, 14 are formed on the common substrate 10. As a result, it is possible to make the coordinate input device sufficiently thin and to improve markedly the light transmittance, compared with the conventional coordinate input device comprising a first substrate having first electrodes formed thereon and a second substrate having second electrodes formed thereon and arranged to face the first substrate with a predetermined space provided therebetween.

In the embodiment described above, the first and second electrodes 12, 14 are made of the same material and formed by the same process. However, these first and second electrodes may be made of different materials and formed by different processes. Of course, the materials of the first and second electrodes 12, 14 and the flexible electrode 16 need not be limited to those employed in the embodiment described above. In other words, various other materials can be used, as desired.

Figure 8:
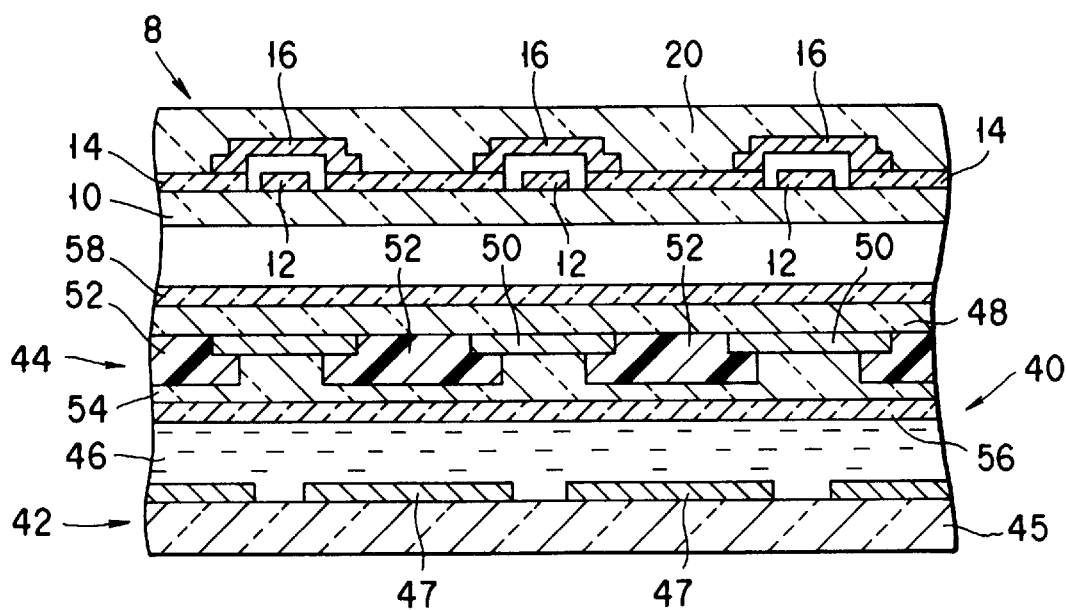
FIG. 8 is a cross sectional view showing an input display device according to an embodiment of the present invention.

There will now be described an input display apparatus according to an embodiment of the present invention, wherein the coordinate input device 8 of the construction described above and a liquid crystal display device 40 are combined and which has both the coordinate input function and the image display function, as shown in FIG. 8.

The liquid crystal display device 40 included in the input display apparatus comprises an array substrate 42, a counter substrate 44 disposed to face the array substrate 42, and a liquid crystal layer 46 sealed between these substrates 42, 44.

The array substrate 42 comprises a substrate 45 made of a light transmitting material such as glass. Pixel electrodes 47, and a switching elements, etc. (not shown) are formed on the substrate 45. Also formed on the substrate 45 are scanning lines (not shown) and signal lines (not shown) which are arranged in a matrix manner. The pixel electrodes 47 are positioned between these scanning lines and signal lines.

On the other hand, the counter substrate 44 comprises a substrate 48 made of a light transmitting material such as glass. Laminated on one main surface of the substrate 48 are a light shielding layer 50 in the matrix shape (black matrix), a color filter 52, and an over-coating layer 54 in this order. Further, a counter electrode 56 in contact with the liquid crystal layer 46 is formed on the over-coating layer 54. A polarizing plate 58 is provided on the other main surface of the substrate 48.

Figure 9:
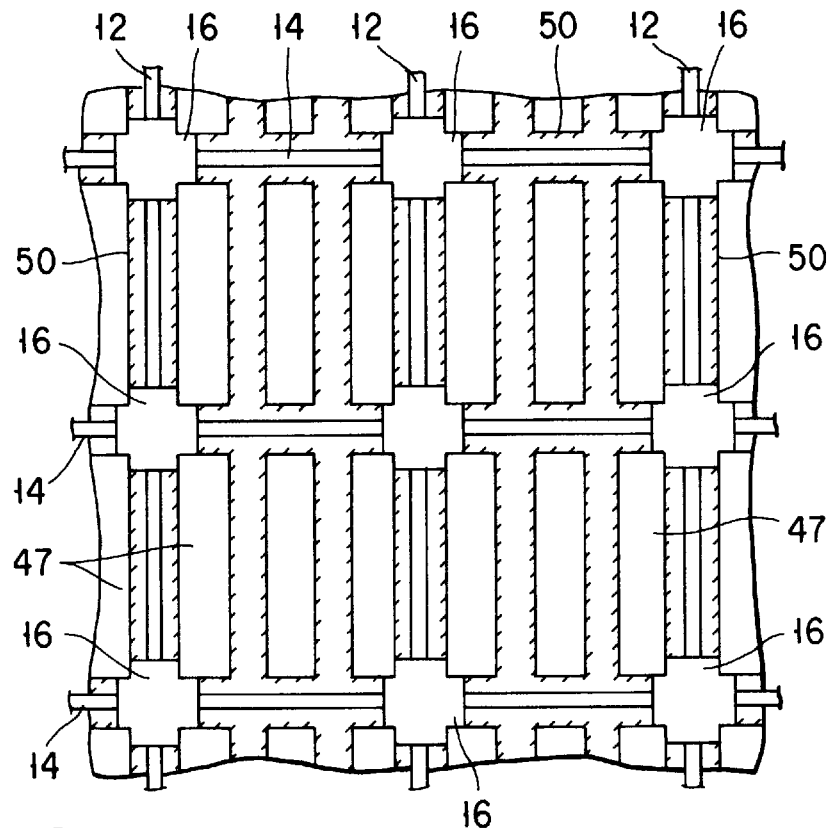
FIG. 9 is a plan view schematically showing the input display device shown in FIG. 8.

On the other hand, the coordinate input device 8 is arranged in front of the liquid crystal display device 40 such that the substrate 10 of the device 8 is positioned to face the polarizing plate 58 of the liquid crystal display device 40 with a predetermined free space provided therebetween. In this case, the peripheral portion of each pixel electrode 47 forming a display unit of the picture image displayed by the liquid crystal display device 40 is overlapped with the light shielding layer 50 and, thus, fails to contribute to the display. In consideration of the above circumstances, the coordinate input device 8 is positioned with respect to the liquid display device 40 so that the first and second electrodes 12, 14 and the flexible electrode 6 are overlapped with the regions shielded by the light shielding region 50 of the liquid crystal display device 40, as shown in FIGS. 8 and 9.

In the display input apparatus, three pixel electrode are located between two adjacent flexible electrodes 16 on each second electrode 14, and a single pixel electrode 47 is located between two adjacent flexible electrodes 16 on each first electrode 12.

According to the input display apparatus constructed as described above, the light emitted from the liquid crystal display device 40 passes through only the substrate 10 and the protective layer 20 of the coordinate input device 8. Since the flexible electrodes 16 and the first and second electrodes 12, 14 are arranged to face the light shielding layer 50 of the liquid crystal display device 40, they do not give any adverse effect to the light emitted from the liquid crystal display device. Accordingly, the loss of light passing through the coordinate input device 8 is caused by only the substrate 10 and the protective layer 20, making it possible to achieve a high light transmittance so as to obtain a bright image, compared with the conventional input display apparatus.

It should be noted that, if the surface of the coordinate input device 8 has a high reflectance, the ambient light is reflected by the surface of the device 8, leading to a low contrast of the displayed image. In the present invention, however, each of the first and second electrodes 12, 14 is made of a transparent ITO. Therefore, the ambient light passing through the first and second electrodes is absorbed by the light shielding layer 50, with the result that the contrast of the displayed image is not adversely affected.

Where each of the first and second electrodes 12, 14 is made of a light reflecting material, it is possible for these electrodes to cause the contrast of the input display device to be lowered. The particular difficulty is also brought about, where the flexible electrode 16 is included in the coordinate input device. To overcome this difficulty, it is desirable to form an anti-reflection film to cover the first and second electrodes 12, 14 or the flexible electrodes 16, followed by forming the protective layer 20 to cover the anti-reflection film. In this case, the reflection of the ambient light can be markedly suppressed, making it possible to obtain a high quality picture image.

In the embodiment described above, the light shielding layer 50 surrounding the periphery of each pixel of the liquid crystal display device 40 is positioned to overlap with the first and second electrodes 12, 14 of the coordinate input device 8. However, the light shielding layer may not be required in some cases depending on the display mode of the liquid crystal display device. Even in this case, however, the similar effect can be obtained by allowing the peripheral portion of the pixel to overlap with the electrode of the coordinate input device, because the peripheral portion of the pixel does not contribute to the image display.

It should be noted that a plane of the coordinate input device 8 are dotted with the flexible electrodes 16. Therefore, it may be reasonable to understand that any of the flexible electrodes 16 may not be depressed depending on the point where external pressure is applied to the coordinate input device 8. However, no practical problem is brought about in the present invention. Specifically, since each pixel of the liquid crystal display device is sized about 0.2 to 0.3 mm in general, any of the flexible electrodes 16 is deformed, if the tip portion of the writing pen used for the pressure application has a diameter larger than the above-noted size of the pixel.

As described above, the first and second electrodes 12, 14 are formed on the common substrate 10 in the coordinate input device 8 included in the input display apparatus, making it possible to decrease the thickness of the coordinate input device 8. Also, the light emitted from the liquid crystal display device 40 is transmitted through only the substrate 10 and the protective layer 20 of the coordinate input device 8, making it possible to minimize the light loss. Naturally, it is possible to achieve a high light transmittance and obtain a bright displayed image, compared with the conventional device.

Figure 10:
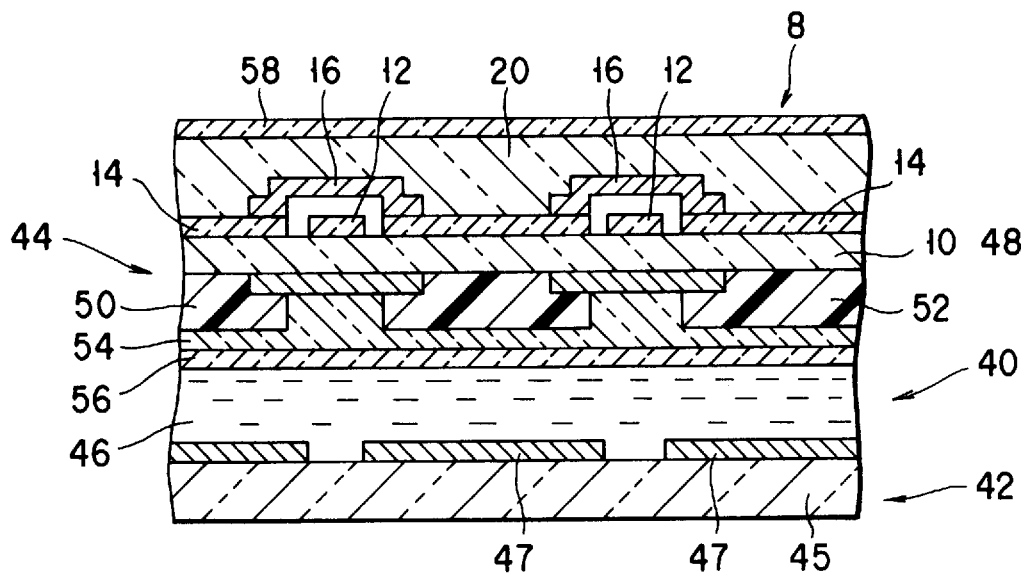
FIG. 10 is a cross sectional view showing an input display device according to another embodiment of the present invention.

FIG. 10 shows an input display device according to another embodiment of the present invention. In this embodiment, the coordinate input device 8 is mounted directly on the substrate 48 of the counter substrate 44 included in the liquid crystal display device 40. In other words, the substrate 10 of the coordinate input device 8 is also used as the substrate 48 of the counter substrate 44. As seen from the drawing, the first and second electrodes 12, 14, flexible electrodes 16, protective layer 20 and polarizing plate 58 are laminated in this order on one main surface of the substrate 48. On the other hand, the light shielding layer 50, which is arranged to form a matrix on the other main surface of the substrate 48, is positioned to face the first and second electrodes 12, 14 and flexible electrodes 16 of the coordinate input device 8. Further, the color filter 52, overcoating layer 54 and counter electrode 56 are laminated in this order on the light shielding layer 50.

A liquid crystal layer 46 sealed between the counter electrode 44 and the array substrate 42 consists of a guest-host type liquid crystal material prepared by mixing a dichroic dye in a liquid crystal compound, or a TN type liquid crystal material. In the case of using a TN type liquid crystal material, it is necessary to use a polarizing plate, though such a plate need not be used in the case of using a guest-host type liquid crystal material. The polarizing plate 58, if used, should be provided with a hard coating to enable the plate 58 to withstand the pressure of a writing pen, and should be pasted to the protective layer 20.

The input display apparatus shown in FIG. 10 is equal to the apparatus shown in FIGS. 8 and 9 in construction of the portions other than that described above. Therefore, the members common in these apparatuses are denoted by the same reference numerals, and the description thereof will be omitted.

According to the input display apparatus shown in FIG. 10, the electrodes of the coordinate input device 8 are formed directly on the substrate 48 of the counter substrate 44 of the liquid crystal display device 40, making it possible to omit the substrate 10 of the coordinate input device. As a result, the light emitted from the liquid crystal display device 40 is affected by only the protective layer 20 of the coordinate input device 8. It should be noted in this connection that the protective layer 20 is so thin that the light transmitted therethrough is hardly affected by the protective layer 20. Thus, the brightness of the display screen of the input display device is substantially equal to that of the liquid crystal display device 40 used as an independent display device. Further, since the distance between the input plane of the coordinate input device 8 and the liquid crystal display device 40 is decreased, it is possible to diminish sufficiently the difference between the actual coordinate input position and the display position when the display is viewed obliquely. It follows that it is possible to obtain an input display device which is quite free from a sense of incompatibility in the coordinate input stage. Further, since the electrodes of the coordinate input device 8 are formed in direct contact with the substrate 48 of the counter substrate 44, a positional deviation can be prevented between the coordinate input device and the liquid crystal display device, leading to an improved input accuracy.

It should also be noted that the thickness of the protective layer 20 can be determined appropriately as far as the protective layer 20 is capable of withstanding the pressure applied thereto in the coordinate input stage. For example, the thickness can be determined to enable the protective layer 20 to act as an anti-reflection film of the counter electrode. In this case, a high quality image having a sufficiently high contrast can be obtained.

Figure 11:
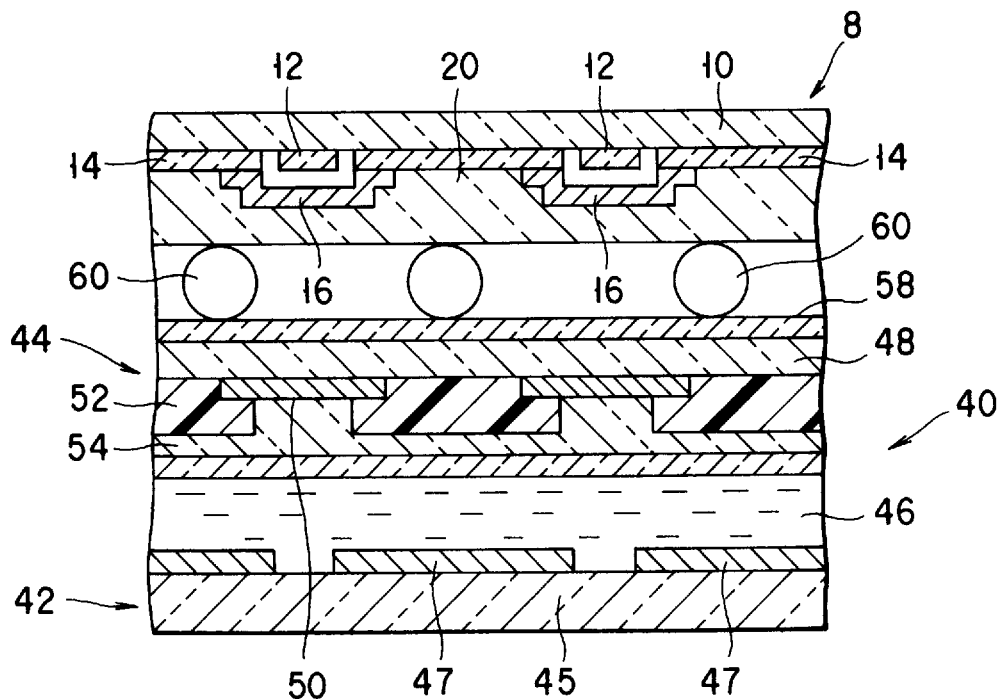
FIG. 11 is a plan view showing an input display device according to still another embodiment of the present invention.

FIG. 11 shows an input display apparatus according to still another embodiment of the present invention. The apparatus shown in FIG. 11 differs from the apparatus shown in FIG. 8 in that, the substrate 10 of the coordinate input device 8 is made of a flexible material, and that the coordinate input device 8 is positioned such that the protective layer 20 directly faces the liquid crystal display device 40.

To be more specific, the substrate 10 of the coordinate input device 8 is formed of a flexible PET film 0.1 mm thick. Also, the first and second electrodes 12, 14, flexible electrodes 16 and protective layer 20 are formed on the flexible substrate 10. The coordinate input device 8 is arranged to face the front surface of the counter substrate 44 of the liquid crystal display device 40 with spacers 60 interposed therebetween such that a predetermined space is defined between the device 8 and the counter substrate 44. As seen from FIG. 11, the coordinate input device 8 is positioned so that the protective layer 20 covering the flexible electrodes 16 faces the counter substrate 44. Incidentally, the polarizing plate 58 may be formed to cover the opposing substrate 44 depending on the operating mode of the liquid crystal display device.

The input display apparatus shown in FIG. 11 is equal to the apparatuses shown in FIGS. 8 and 9 in construction of the portions other than that described above. Therefore, the members common in these devices are denoted by the same reference numerals, and the description thereof will be omitted.

In operating the input display device shown in FIG. 11, the input plane of the coordinate input device 8 is selectively depressed with a writing pen or a finger. As a result, the flexible substrate 10 is deformed sufficiently to permit the protective layer 20 to be pressed against the counter electrode 44 of the liquid crystal display device 40. When the protective layer 20 is pressed, the flexible electrode 16 is deformed in the reverse direction so as to bring the second electrode 14 into electrical contact with the corresponding first electrode 12. In other words, the electric circuit (or flexible electrode 16) corresponding to the depressed point of the input plane of the coordinate input device 8 is turned on. The position of the deformed electrode 16 is detected as already described in conjunction with the coordinate detecting method so as to detect the coordinates of the pressure-applied point.

The input display apparatus shown in FIG. 11 also permits improving the light transmittance through the coordinate input device 8 so as to obtain a satisfactory display, compared with the prior art. It should also be noted is that the distance between the display plane of the liquid crystal display device and the coordinate input plane is decreased, making it possible to diminish sufficiently the difference between the actual coordinate input position and the display position when the display is viewed obliquely. Further, the input plane of the coordinate input device 8 is formed of the flexible substrate 10 in place of the protective layer 20 which is relatively weak against the pressure applied thereto by a writing pen or the like. Therefore, the input display device constructed as shown in FIG. 11 exhibits an improved durability.

The present invention is not limited to the embodiments described above, and can be modified in various fashions. For example, the liquid crystal display device used in combination with the coordinate input device of the present invention can be replaced by another display device such as a cathode ray tube so as to form the input display apparatus of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A coordinate input device comprising:
    a plurality of first wirings formed on a substrate to extend in parallel in a first direction;
    a plurality of second wirings formed on the substrate to extend in parallel in a second direction perpendicular to the first direction, the intersections of the second wirings with the first wirings being removed to form intermittent divided sections; and
    a plurality of flexible electrodes each of which is bridged between two adjacent divided sections of each second wiring to electrically connect the divided sections each other and faces the first wiring located between the two adjacent divided sections, with a free space defined therebetween, the flexible electrode being deformable upon receipt of an external pressure applied from outside toward the first wiring so as to be brought into an electrical contact with the first wiring.

2. A coordinate input device according to claim 1, wherein the substrate is made of a light transmitting material, and at least one of the first wiring, second wiring and flexible electrode is made of a light transmitting material.

3. A coordinate input device according to claim 1, further comprising:
    means for applying a voltage to one end of each first wiring through a resistance electrode; and
    arithmetic means connected to the other end of each first wiring through another resistance electrode and to both ends of each second wiring through additional resistance electrodes, for detecting the coordinates of the flexible electrode electrically connected to the corresponding first wiring upon receipt of an external pressure, based on the currents supplied through the resistance electrodes.

4. A coordinate input device according to claim 1, further comprising:
    a first scanning circuit including a plurality of first switches connected to one ends of the first wirings, the first switches being capable of being closed and opened successively;
    a second scanning circuit including a plurality of second switches connected to one ends of the second wirings, the second switches being capable of being closed and opened successively;
    means for applying a voltage to the second wirings through the second scanning circuit; and
    arithmetic means connected to the first wirings through the first scanning circuit, for detecting the coordinates of the flexible electrode electrically connected to the corresponding first wiring upon receipt of an external pressure, on the basis of the current supplied to the arithmetic means through the first scanning circuit.

5. A coordinate input device according to claim 1, further comprising:
    a protective layer formed on the substrate to cover the first and second wirings and the flexible electrodes.

6. An input display apparatus comprising:
    a display device; and
    a coordinate input device arranged to face a display plane of the display device;
    the coordinate input device including:
        a plurality of first wirings formed on a substrate to extend in parallel in a first direction;
        a plurality of second wirings formed on the substrate to extend in parallel in a second direction perpendicular to the first direction, the intersections of the second wirings with the first wirings being removed to form intermittent divided sections; and
        a plurality of flexible electrodes each of which is bridged between two adjacent divided sections of each second wiring to electrically connect the divided sections each other and faces the first wiring located between the two adjacent divided section, with a free space defined therebetween, the flexible electrode being deformable upon receipt of an external pressure applied from outside toward the first wiring so as to be brought into an electrical contact with the first wiring.

7. An input display apparatus according to claim 6, wherein at least one of the first and second wirings and flexible electrode is formed of a light transmitting material.

8. An input display apparatus according to claim 6, wherein the display device includes a plurality of pixels forming an image, and the first and second wirings and flexible electrodes included in the coordinate input device are arranged to face the peripheral portions of the pixels of the display device.

9. An input display device according to claim 6, wherein the display device includes a light transmitting substrate which constitutes the display plane and the substrate of the coordinate input device.

10. An input display apparatus according to claim 6, further comprising:
    means for applying a voltage to one end of each first wiring through a resistance electrode; and arithmetic means connected to the other end of each first wiring through another resistance electrode and to both ends of each second wiring through additional resistance electrodes, for detecting the coordinates of the flexible electrode electrically connected to the corresponding first wiring upon receipt of an external pressure based on the currents supplied through the resistance electrodes.

11. An input display apparatus according to claim 6, further comprising:
   a first scanning circuit including a plurality of first switches connected to respective one ends of the first wirings, the first switches being capable of being closed and opened successively;
   a second scanning circuit including a plurality of second switches connected to respective one ends of the second wirings, the second switches being capable of being closed and opened successively;
   means for applying a voltage to the second wirings through the second scanning circuit; and
   arithmetic means connected to the first wirings through the first scanning circuit, for detecting the coordinates of the flexible electrode electrically connected to the corresponding first wiring upon receipt of the external pressure, on the basis of the current supplied to the arithmetic means through the first scanning circuit.

12. An input display device according to claim 6, further comprising:
   a protective layer formed on the substrate to cover the first and second wirings and the flexible electrodes,
   wherein the substrate of the coordinate input device is formed of a flexible material, and the coordinate input device is arranged such that the protective layer is positioned to face the display plane of the display device.

13. An input display device according to claim 6, wherein the display device includes an array substrate having a plurality of pixel electrodes formed thereon; a counter substrate having a light shielding layer positioned to face the peripheral portion of each of the pixel electrodes, and a counter electrode formed thereon; and a liquid crystal layer sealed between the array substrate and the counter substrate, and
   the coordinate input device is arranged to face the counter substrate of the display device such that the first and second wirings and the flexible electrodes are overlapped with the light shielding layer of the display device.

* * * * *